United States Patent
Bohn et al.

(10) Patent No.: US 8,076,807 B2
(45) Date of Patent: Dec. 13, 2011

(54) CONNECTION SYSTEM COMPRISING AN EXTERNAL CABLE GUIDE ON WIPER MOTOR HOUSINGS

(75) Inventors: Roland Bohn, Buehl (DE); Mario Huesges, Buehlertal (DE); Detlef Lauk, Renchen (DE); Orlando Sterns, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 284 days.

(21) Appl. No.: 12/443,368

(22) PCT Filed: Jul. 31, 2007

(86) PCT No.: PCT/EP2007/057892
§ 371 (c)(1),
(2), (4) Date: Mar. 27, 2009

(87) PCT Pub. No.: WO2008/037529
PCT Pub. Date: Apr. 3, 2008

(65) Prior Publication Data
US 2010/0001599 A1    Jan. 7, 2010

(30) Foreign Application Priority Data
Sep. 28, 2006   (DE) .......................... 10 2006 045 928

(51) Int. Cl.
*H02K 11/00*    (2006.01)
(52) U.S. Cl. ......................................................... 310/71
(58) Field of Classification Search ................... 310/71, 310/43
See application file for complete search history.

(56) References Cited

U.S. PATENT DOCUMENTS

| | | | | |
|---|---|---|---|---|
| 5,063,317 A | * | 11/1991 | Bruhn | 310/91 |
| 5,218,255 A | * | 6/1993 | Horiguchi | 310/71 |
| 5,723,924 A | | 3/1998 | Blanchet | |
| 6,088,905 A | * | 7/2000 | Boyd et al. | 29/598 |
| 7,948,128 B2 | * | 5/2011 | Pauli et al. | 310/71 |
| 2006/0113942 A1 | | 6/2006 | Amagasa | |
| 2006/0163958 A1 | | 7/2006 | Yagi et al. | |
| 2007/0278873 A1 | | 12/2007 | Macaire | |

FOREIGN PATENT DOCUMENTS

| | | |
|---|---|---|
| DE | 102004036419 | 3/2006 |
| FR | 2864717 A1 | 7/2005 |
| JP | 02-122557 | 5/1990 |
| JP | 2002078283 | 3/2002 |

OTHER PUBLICATIONS

PCT/EP2007/057892 International Search Report.

* cited by examiner

*Primary Examiner* — Nguyen N Hanh
(74) *Attorney, Agent, or Firm* — Michael Best & Friedrich LLP

(57) ABSTRACT

The invention relates to a connection system comprising an external cable guide for electrically connecting at least two components (4, 5) that are arranged at a distance from each other on a motor subassembly (1), the positions of said components being fixed in relation to the housing parts (2, 3) of the motor subassembly (1). Said connection system also comprises at least one electric cable (6) connecting the components (4, 5) that are arranged on the motor subassembly (1) and a support element (7) on the outer side of the housing (2, 3) of the motor subassembly (1) that defines the geometric path of the electric cable (6).

18 Claims, 2 Drawing Sheets

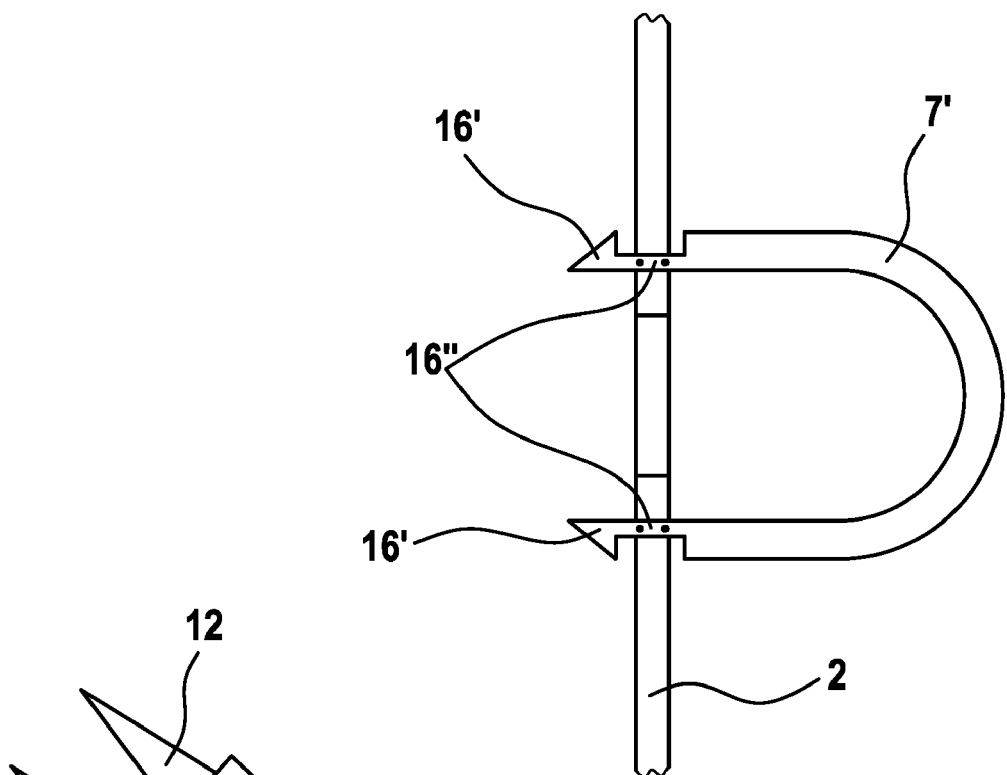
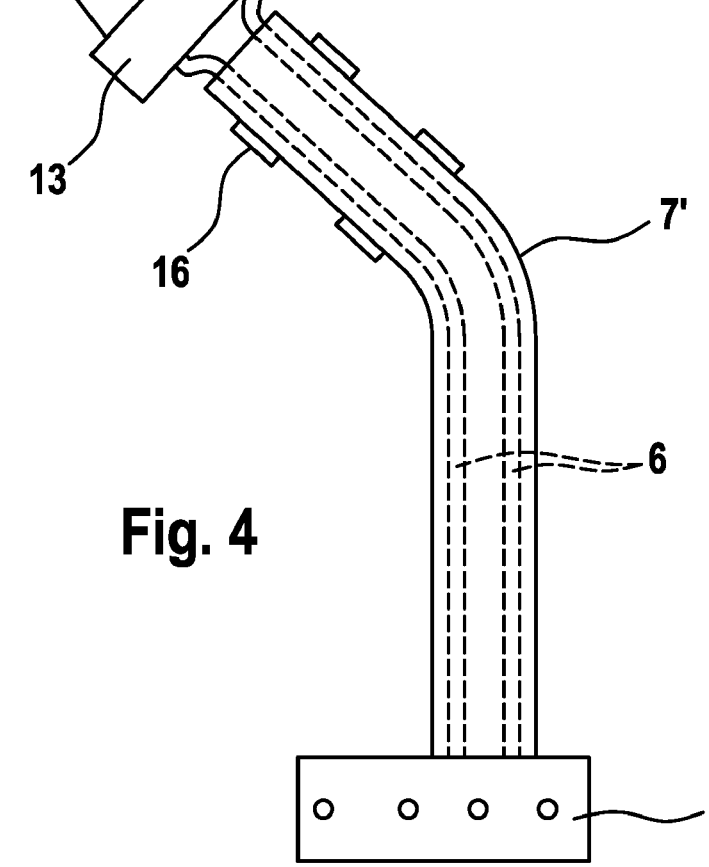
Fig. 3
Fig. 4

CONNECTION SYSTEM COMPRISING AN EXTERNAL CABLE GUIDE ON WIPER MOTOR HOUSINGS

BACKGROUND OF THE INVENTION

The invention relates to a connection system comprising an external cable guide on wiper motor housings, as can be used, in particular, for making contact between control contacts and wiper motors in vehicles.

An established way of using electric motors as drives of wiper systems is embedding an electric motor in a complex assembly, called motor assembly in the text which follows, which, in addition to the actual motor, comprises gear mechanism components, housing parts, fixing means and electrical connection means. In this case, the electrical connection means are frequently arranged in the immediate vicinity of the motor parts with which contact is to be made, in order to be able to realize short conduction paths. An important constituent part of these electrical connection means, by means of which power is supplied to the electric motor during the operating phases, are so-called carbon brushes which are arranged in a brush holder. The brush holder is generally connected to a plugging slot which can be connected to a connection plug, this guaranteeing quick and easy connection of the motor assembly during installation.

In the interests of simplified connection, the connection plugs used are frequently designed such that the motor assembly is fully ready for operation when said connection plugs are connected. Consequently, components with which contact is to be made and which are arranged on the motor assembly at a distance from the plugging slot on the brush holder or the connection plug have to be connected via separate feed lines which lead from the respective installation site of the components with which contact is to be made to the plugging slot on the brush holder or the connection plug, in order to ensure the ability to make an integral connection in the manner discussed above.

Components on motor assemblies which are used as wiper drives, which components are regularly used, with which contact is to be made and which are at a distance from the connection plug, are control contacts with which the position of the gear mechanism elements within the motor assembly is detected, in order to be able to correctly control the turning position and park position of a wiper system.

To this end, the control contacts are integrated in a contact holder such that their ends come into electrically conductive contact with moving parts of the gear mechanism, from which parts the precise position of the output shaft on which the wiper blade is located can be derived, or can communicate with them in some other way. In this case, the position of the control contacts is defined by correspondingly fixing the contact holder, for example in an opening in the gear mechanism housing.

Particularly in the case of arrangement of the brush holder at the end of the motor housing, a relatively large distance has to be bridged between the control contacts and the plugging slot arranged on the brush holder, this being realized, according to the prior art, by extrusion-coated metal strips which are integrated in the gear mechanism cover or by cables which run freely across the outside of the motor assembly.

The variant with metal strips running in the gear mechanism cover complicates production of the gear mechanism cover and, when changes are needed or there are defects in the contact-connection to the control contacts, always requires replacement of the entire gear mechanism cover. In addition, combination with metal housing components makes it necessary to separately insulate lines which are to be conducted further. The variant with cables which run freely across the outside of the motor assembly is associated, in particular, with the risk of damage to the cables due to operation-related shock effects or other external effects, this possibly leading to the cables being pulled off and functional faults resulting from this.

SUMMARY OF THE INVENTION

The object of the invention is to specify a connection system for electrically connecting two components which are arranged at a distance from one another on a motor assembly, in particular for connecting control contacts to wiper motors, which connection system is distinguished by a low level of outlay on installation and improved functional reliability as compared to the prior art and can be easily adapted to changing connection requirements.

The invention concerns a connection system comprising an external cable guide for electrically connecting at least two components which are arranged at a distance from one another on a motor assembly and whose positions in relation to the housing parts of the motor assembly are fixed. The connection system according to the invention comprises at least one electrical line, which connects the components which are arranged on the motor assembly, and a supporting element on the outside of the housing of the motor assembly, which supporting element determines the geometric profile of the electrical line. Since the geometric profile of the electrical line is determined, the disadvantages of cables which run freely across the outside of the motor assembly can be avoided by defining a suitable profile for the cables. In this case, the profile of the electrical line is selected such that the risk of damage during the fitting and servicing processes which are to be expected is avoided. In addition, the supporting element itself at least partially protects the electrical line from shock and external effects.

The connection system according to the invention is suitable, in particular, for applications in which the motor assembly is a motor assembly of a wiper drive of a vehicle and at least one of the components whose position in relation to the housing parts of the motor assembly is fixed is a contact holder with control contacts for determining the position of at least one gear mechanism element. In this case, the relatively large distance, which is necessary for design reasons, between the contact holder and connection means for making connection with the motor assembly can be bridged according to the invention in order to realize the drive function.

It is advantageous when the supporting element is a plastic channel which is connected to at least one housing part of the motor assembly. The connection to the housing part ensures adequate fixing in position, the design of the supporting element as a channel permits encapsulated line guidance, this making the system particularly insensitive to damage to the electrical lines.

The electrical connection itself can be made by means of electrical lines in the form of cables, that is to say in each case with separate insulation which is associated with the conductors, or by means of electrically conductive strips with relative positions which are matched to one another. Both the cables and the electrically conductive strips can be inserted and/or injection-molded in the plastic channel. The variant of injection-molding permits particularly stable, shock-resistant and installation-friendly implementation of the concept of the invention, it being possible for the material of the plastic channel, preferably polypropylene, to act simultaneously as an insulator between various electrical lines.

It is particularly advantageous when the supporting element is connected firmly to the housing of a plug or plugging slot by means of which connection is made with the motor assembly. In this case, the connection to be established between the connection plug or the plugging slot and the housing part of the motor assembly serves additionally as a guidance aid and fixing means during arrangement of the supporting element. By contrast, the supporting element can serve as a guidance aid when fixing the plug arrangement for connection of the motor assembly.

A similarly advantageous refinement of a connection according to the invention is provided when the supporting element is connected firmly to a plugging adapter which is arranged between a plug, by means of which connection is made with the motor assembly, and a plugging slot which is located on the motor housing. An adapter of this kind can be used to match the connection system to specific customer requests with a low level of outlay, without having to change the plugging slot on the motor assembly. If the supporting element and the associated electrical lines are connected to the adapter, this produces a component which has all the functions of the system according to the invention and can be quickly replaced or installed. Particularly in this case, it is advantageous when the supporting element is releasably connected to at least one housing part of the motor assembly by means of a plurality of connecting elements.

If it is not necessary to change over the connection system quickly, said supporting element may be adhesively bonded to at least one housing part of the motor assembly, this providing a particularly robust design which also virtually prevents the supporting element being accidentally engaged in from behind and prevents the damage associated with this.

For the reasons cited above, it may likewise be advantageous when the supporting element is connected firmly to a contact holder with control contacts.

BRIEF DESCRIPTION OF THE DRAWINGS

The invention will be explained in greater detail using an exemplary embodiment. In the drawings:

FIG. 3 shows a sectional illustration of a connecting plastic channel according to the invention with connecting elements;

FIG. 4 shows an exchangeable component for realizing a connection system according to the invention.

DETAILED DESCRIPTION

Figure 1:
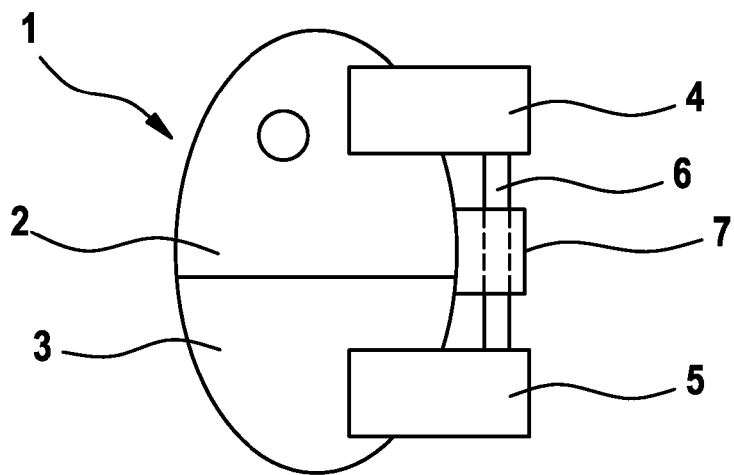
FIG. 1 shows the basic structure of a connection system according to the invention.

FIG. 1 shows the basic structure of a connection system according to the invention comprising an external cable guide. Said connection system is arranged on a motor assembly 1 with a plurality of housing parts 2, 3 and comprises two components 4 and 5 which are arranged at a distance from one another and whose positions in relation to the housing parts 2, 3 of the motor assembly 1 are fixed. The two components 4, 5 are connected by an electrical line 6, with a supporting element 7, which determines the geometric profile of the electrical line 6, being arranged on the outside of the housing 2, 3 of the motor assembly 1.

Figure 2:
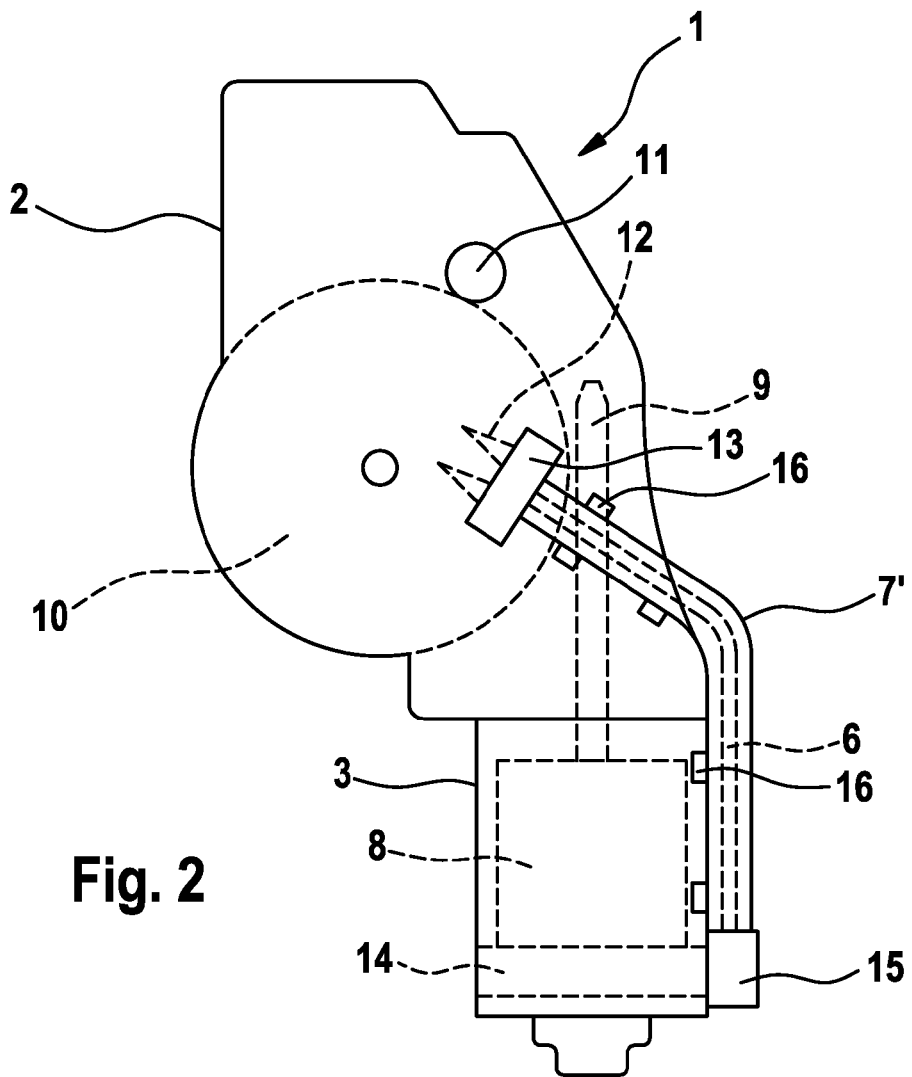
FIG. 2 shows a connection system according to the invention with a plastic channel.

FIG. 2 shows a connection system according to the invention with a plastic channel 7' as a supporting element. The motor assembly 1 has the typical shape of a wiper drive which is in the form of an individual drive and which has a wheel crank mechanism. However, use of the invention is in no way restricted to such wiper drives.

An electric motor 8 is located in a lower housing part 3, the motor housing. A wheel crank mechanism is accommodated in an upper housing part 2, the gear mechanism housing. The electric motor 8 drives a spur wheel 10 of the gear mechanism via a motor shaft 9 and causes said spur wheel to rotate in a uniform manner when the wiper drive is operated. This uniform rotation is converted into a periodic movement, which is required for a wiper drive, of an output shaft 11 by the special form of gear mechanism.

Control contacts 12 whose position is determined by fixing a contact holder 13 in an opening in the gear mechanism housing 2 are provided in the vicinity of the spur wheel 10, which is provided with a contact disk, in order to determine the position of the output shaft 11.

A brush holder 14 which carries the carbon brushes required for operation of the electric motor is located at the lower end of the motor housing 3, that is to say that end which is remote from the motor shaft. The brush holder comprises, on the outside of the motor housing, a plugging slot or connection plug by means of which the entire motor assembly is connected. The plug housing 15 comprises all the contacts necessary for this.

Electrical lines 6 for connection of the control contacts 12 run between the contact holder 13 with the control contacts 12 and the plug housing 15. In this case, the distance between the connection plug on the brush holder 14 and the contact holder 13 is bridged substantially by a supporting element in the form of a plastic channel 7' comprising polypropylene, into which channel the electrical lines 6 are inserted in the form of individual cables. The plastic channel 7' is connected firmly to the plug housing 15. In contrast, the contact holder 13 is connected in a flexible manner to the plastic channel 7', as a result of which ease of installation is improved in the case of specific housing forms.

As an alternative to this, refinements are possible in which the contact holder 13 is likewise connected firmly to the plastic channel 7'. As a further alternative to this, the electrical lines 6 can simultaneously represent the only connecting elements between the contact holder 13 and the plastic channel 7', it being possible to realize this by virtue of a gap between the plastic channel 7' and the contact holder 13, in which gap the electrical lines 6 which otherwise run in an encapsulated manner are exposed.

The plastic channel 7' itself is releasably connected to the gear mechanism housing 2 and the motor housing 3 by means of a plurality of connecting elements 16.

FIG. 3 shows a sectional illustration of a plastic channel 7' according to the invention with exemplary connecting elements 16. In order to be able to establish a releasable connection between the plastic channel 7' with a u-shaped cross section and a corresponding housing part 2, the plastic channel 7' has, at its edge in an extension to the lateral channel walls, pins 16" which are provided with hook elements 16' and are to be inserted into corresponding openings in the respective housing part 2. In this case, the position of the pins 16" is selected such that the hook elements 16' engage behind the perforated housing surface 2 when the pins 16" are inserted, with this position being adequately ensured by elastic restoring forces which are created by slight deformation of the plastic channel 7'. The result is a latching, predominantly interlocking, connection between the plastic channel 7' and the respective housing part 2, which connection can be easily released by greater deformation of the plastic channel 7', which deformation can be achieved, for example, by forceful compression, when the deformation ensures adequate disengagement of the hook elements 16'. As an alternative to this, bores in the lower housing part 3, the motor housing or so-called pole housing, are feasible, into which bores clips which are located on the plastic channel 7' can latch. These bores would have to be formed between magnets which may be arranged there.

As an alternative to this, complementary latching systems are feasible, in which hook elements which are connected to the housing surfaces engage in corresponding openings in the plastic channel 7' and are elastically splayed.

FIG. 4 shows an exchangeable component for realizing a connection system according to the invention. This component comprises a plugging adapter 17 which is arranged between a connection plug, by means of which connection is made with the motor assembly, and a plugging slot which is located on the motor housing. A plastic channel 7' is again arranged on this plugging adapter 17 as a supporting element. A contact holder 13 with control contacts 12 is fitted to that end of the plastic channel 7' which is remote from the plugging adapter 17. The control contacts 12 on the contact holder 13 are connected to corresponding connections in the plugging adapter 17 via the electrical lines 6 which are inserted in the plastic channel 7'. The inclusion of the plugging adapter 17 in the connection concept of the motor assembly means different consumer plugs can be connected to the plugging slot on the motor housing 3. The described combination of plugging adapter 17, plastic channel 7' with inserted electrical lines 6 and contact holder 13 with control contacts 12 provides a component which can be quickly exchanged and installed and has all the functions of the system according to the invention.

During installation, in first instance, the contact holder 13 with the control contacts 12 is to be inserted into an opening in the gear mechanism housing 2, which opening is provided for said contact holder 13, and fixed. The plugging adapter 17 is then placed in the plugging slot on the motor housing 3 and the plastic channel 7' is fixed. The advantage of the quickly exchangeable adapter 17 is retained when the plastic channel 7' is releasably fixed. To this end, the plastic channel 7' likewise has, in that part which is fixed to the gear mechanism housing 2, the above-described connecting elements 16 which are required for realizing a latching connection. No further fixing points are present on the motor housing 3 apart from the fitted plugging adapter 17. The rigidity of the plastic channel 7' nevertheless ensures adequate stabilization and geometric determination of the line profile for the purposes of the invention. On account of this design, it is not necessary to alter the motor housing 3, which often comprises relatively solid metal, for corresponding fixing means. The receptacles which are required for realizing releasable fixing are instead required solely in the region of the gear mechanism housing 2, this being associated with significantly lower outlay on account of being formed from plastic, for example as an injection-molded part. Fixing of the plastic channel 7' according to the invention can be assisted by further fixing means, for example by corresponding binders, if necessary.

The invention claimed is:

1. A connection system comprising an external cable guide for electrically connecting at least two components (4, 5) which are arranged at a distance from one another on a motor assembly (1) and whose positions in relation to two housing parts (2, 3) of the motor assembly (1) are fixed, comprising at least one electrical line (6), which connects the components (4, 5) which are arranged on the motor assembly (1), and a supporting element (7) on the outside of at least one of the housing parts (2, 3) of the motor assembly (1), which supporting element determines the geometric profile of the electrical line (6), the supporting element (7) being releasably secured to the motor assembly (1) by a plurality of connecting elements (16) engaging at least one of the housing parts (2, 3).

2. The connection system as claimed in claim 1, characterized in that the motor assembly (1) is a motor assembly of a wiper drive of a vehicle, and at least one of the components, whose positions in relation to the housing parts (2, 3) of the motor assembly are fixed, is a contact holder (13) with control contacts (12) for determining the position of at least one gear mechanism element.

3. The connection system as claimed in claim 1, characterized in that the supporting element (7) is a plastic channel (7') which is connected to at least one housing part (2) of the motor assembly (1).

4. The connection system as claimed in claim 3, characterized in that the plastic channel (7') contains at least one cable which is inserted in the plastic channel (7') or a conductive strip which is inserted in the plastic channel (7') as an electrical line (6).

5. The connection system as claimed in claim 3, characterized in that the plastic channel (7') contains at least one conductive strip which is injection-molded in the plastic channel (7') or a cable which is injection-molded in the plastic channel (7') as an electrical line (6).

6. The connection system as claimed in claim 1, characterized in that the supporting element (7) is connected firmly to the housing (15) of a plug or plugging slot by means of which connection is made with the motor assembly (1).

7. The connection system as claimed in claim 1, characterized in that the supporting element (7) is connected to a plugging adapter (17) which is coupled to a motor housing (3) of the housing parts (2, 3) and is configured to receive a plug, by means of which connection is made with the motor assembly (1).

8. The connection system as claimed in claim 1, characterized in that the supporting element (7) is connected firmly to a contact holder (13) with control contacts (12) for determining the position of at least one gear mechanism element.

9. The connection system as claimed in claim 1, characterized in that the plurality of connecting elements (16) extend from the supporting element (7).

10. A motor assembly (1) comprising housing parts (2, 3), at least two components (4, 5) which are arranged at a distance from one another, the positions of the components in relation to the housing parts (2, 3) being fixed, and a connection system including an external cable guide for electrically connecting the components (4, 5), at least one electrical line (6) which connects the components (4, 5), and a supporting element (7) on the outside of at least one of the housing parts (2, 3) of the motor assembly (1), which supporting element determines the geometric profile of the electrical line (6), the supporting element (7) being releasably secured to the motor assembly (1) by a plurality of connecting elements (16) engaging at least one of the housing parts (2, 3).

11. A motor assembly (1) as claimed in claim 10, characterized in that the motor assembly (1) is a motor assembly of a wiper drive of a vehicle, and at least one of the components, whose positions in relation to the housing parts (2, 3) of the motor assembly are fixed, is a contact holder (13) with control contacts (12) for determining the position of at least one gear mechanism element.

12. A motor assembly (1) as claimed in claim 10, characterized in that the supporting element (7) is a plastic channel (7') which is connected to at least one housing part (2) of the motor assembly (1).

13. A motor assembly (1) as claimed in claim 12, characterized in that the plastic channel (7') contains at least one cable which is inserted in the plastic channel (7') or a conductive strip which is inserted in the plastic channel (7') as an electrical line (6).

14. A motor assembly (1) as claimed in claim 12, characterized in that the plastic channel (7') contains at least one conductive strip which is injection-molded in the plastic channel (7') or a cable which is injection-molded in the plastic channel (7') as an electrical line (6).

15. A motor assembly (1) as claimed in claim 10, characterized in that the supporting element (7) is connected firmly to the housing (15) of a plug or plugging slot by means of which connection is made with the motor assembly (1).

16. A motor assembly (1) as claimed in claim 10, characterized in that the supporting element (7) is connected to a plugging adapter (17) which is coupled to a motor housing (3) of the housing parts (2, 3) and is configured to receive a plug, by means of which connection is made with the motor assembly (1).

17. A motor assembly (1) as claimed in claim 10, characterized in that the supporting element (7) is connected firmly to a contact holder (13) with control contacts (12) for determining the position of at least one gear mechanism element.

18. A motor assembly (1) as claimed in claim 10, characterized in that the plurality of connecting elements (16) extend from the supporting element (7).

* * * * *